(12) United States Patent
Hilton et al.

(10) Patent No.: US 9,377,147 B2
(45) Date of Patent: Jun. 28, 2016

(54) MULTI-JET MANIFOLD

(75) Inventors: Brooks Hilton, Malibu, CA (US);
Francisco Hinojosa, Jr., Santa Paula, CA (US); Par Dannas, Thousand Oaks, CA (US)

(73) Assignee: B&S PLASTICS INC., Oxnard, CA (US)

( * ) Notice: Subject to any disclaimer, the term of this patent is extended or adjusted under 35 U.S.C. 154(b) by 1124 days.

(21) Appl. No.: 12/316,770

(22) Filed: Dec. 15, 2008

(65) Prior Publication Data
US 2009/0242047 A1    Oct. 1, 2009

Related U.S. Application Data

(60) Provisional application No. 61/007,946, filed on Dec. 14, 2007.

(51) Int. Cl.
*A47K 3/00*    (2006.01)
*E03C 1/00*    (2006.01)
*F16L 41/03*   (2006.01)

(52) U.S. Cl.
CPC .......... *F16L 41/03* (2013.01); *Y10T 137/85938* (2015.04)

(58) Field of Classification Search
CPC .................. F16L 41/03; Y10T 137/85938
USPC .......... 4/541.1–541.6, 696; 285/125.1, 130.1, 285/131.1, 133.11, 179
See application file for complete search history.

(56) References Cited

U.S. PATENT DOCUMENTS

| | | | |
|---|---|---|---|
| 4,320,541 A | 3/1982 | Neenan | 4/492 |
| 4,456,174 A | 6/1984 | Neenan | 239/8 |
| 5,014,372 A | 5/1991 | Thrasher | 4/542 |
| 5,269,029 A | 12/1993 | Spears et al. | 4/541.6 |
| 5,754,989 A * | 5/1998 | Ludlow | 4/541.6 |
| 5,920,925 A | 7/1999 | Dongo | 4/541.6 |
| 5,992,466 A * | 11/1999 | Weise | 138/44 |
| 6,543,067 B2 * | 4/2003 | Eddington et al. | 4/541.1 |
| 2004/0199991 A1 * | 10/2004 | Ciechanowski | 4/541.1 |

OTHER PUBLICATIONS

2005 Waterway Product Catalog, pp. 5-26.

* cited by examiner

*Primary Examiner* — Len Tran
*Assistant Examiner* — Steven M Cernoch
(74) *Attorney, Agent, or Firm* — Koppel, Patrick, Heybl & Philpott

(57) ABSTRACT

Devices, systems and methods for improved multi-jet manifolds for spas, spa accessories and plumbing components are provided. A spa manifold with a first elongated pipe structure with a plurality of arms, a plurality of pipe segments sized to fit one or more of the first pipe arms, and a second elongated pipe structure with a plurality of arms is provided. A plurality of housing pipe segments attached to the remainder of the manifold is also provided, with the housing segments sized to house a jet and/or other spa accessories. A system for providing water and/or air to a grouping of jets and/or spa accessories through at least one manifold is also provided.

23 Claims, 3 Drawing Sheets

MULTI-JET MANIFOLD

This application claims the benefit of provisional application Ser. No. 61/007,946 to Brooks Hilton, et al., which was filed on Dec. 14, 2007.

BACKGROUND OF THE INVENTION

1. Field of the Invention

This invention relates to manifolds for water reservoirs and more particularly to customizable manifolds for use with multiple jets and/or spa accessories in pools, spas and the like.

2. Description of the Related Art

Various hydrotherapy jet systems and other water-related accessories have been developed for use in spas, hot tubs, pools, bath tubs and the like ("spa"). Jets can be arranged to discharge a stream of water to the interior of the spa, which can be aerated through a variety of commercially available discharge nozzles. The various designs provide different characteristics that produce pleasing effects for the spa occupants, and have become quite popular. In the design of single or multi-user spas or tubs, it is common to use a variety of different jet nozzles and/or other spa accessories to provide a variety of different effects.

There are numerous types of jets and accessories that have been developed over the years, which can be placed in a variety of locations and arrangements within a spa. For example, jets have been developed such that the direction of the stream can be adjusted, such as in U.S. Pat. No. 5,269,029 to Spears et al. (assigned to the same assignee as the present invention). Other jets have been developed having fully adjustable directional outlets or ball housings, which are typically mounted in the face plate of the jet or recessed within the jet body. See Waterway Plastics Inc., "2005 Product Catalog", pages 5-26. Still other jets have been developed that produce a pulsating stream of water using a variety of approaches to disturb the flow of water as it projects into the spa, such as in U.S. Pat. No. 4,456,174 to J. Neenan, U.S. Pat. No. 4,320,541 also to J. Neenan, U.S. Pat. No. 5,014,372 to L. Thrasher et al., and U.S. Pat. No. 5,920,925 to Dongo. Furthermore, still other jets have been developed that produce a massaging effect using balls.

While there are countless types of jets, jet systems, and spa accessories, there are limited means by which to arrange the varying types of jets so they can be operative in groupings throughout a spa, while still taking advantage of shared conduit systems that provide water and/or air throughout a spa system to enable various jets to function properly. One way to group jet and/or other spa accessories is by providing an inlet mechanism that caps an assemblage of jet conduits. For example, the "Quad Jet Set" by Venturi Jet Sets allows for the grouping of four jets that share a common water inlet system by providing a structure that caps four jet conduits, with the cap structure providing two inlets into the jet grouping. An additional structure directly adjacent to the cap is provided to supply air into the pipes. However, the Quad Jet Set is only designed to work in a four-jet grouping, where the jets are uniformly spaced apart. Furthermore, the ability to customize the variety, spacing, input of air and water combinations, and other elements of the jet groupings is limited.

SUMMARY OF THE INVENTION

The present invention seeks to provide a multi-jet manifold with an improved and customizable approach to grouping jets and/or other spa accessories that share a common water and/or or air inlet system, with the manifold being durable, inexpensive, and incomplex. One embodiment comprises a spa manifold with a first elongated pipe structure comprising a plurality of arms, and a plurality of pipe segments sized to fit one or more of the first pipe arms. It also comprises a second elongated pipe structure with a plurality of arms, and a plurality of housing pipe segments sized to fit a jet and/or other spa accessory.

Pursuant to another embodiment, a spa manifold is provided comprising a first elongated pipe structure with a plurality of openings and a plurality of pipe segments sized to fit the first pipe structure openings. It also comprises a second elongated pipe structure with a plurality of openings, and a plurality of housing pipe segments sized to fit the openings of the pipe segments and the second elongated pipe structure.

In accordance with yet another embodiment, a spa system utilizing multi-jet/spa accessory manifolds for a spa is provided. The system comprises at least one manifold with: a first pipe structure comprising a plurality of openings; a plurality of pipe housing segments for housing jets and/or spa accessories, with the housing segments sized to mate with the first pipe structure openings; and a second pipe structure providing water into the manifold. The system further provides a water supply flowing into the manifold through the second pipe structure, with the water exiting the manifold through the jets and/or spa accessories and into the interior of a spa.

These and other further features and advantages of the invention will be apparent to those skilled in the art from the following detailed description, taken together with the accompanying drawings, in which:

DETAILED DESCRIPTION OF THE INVENTION

Figure 1:
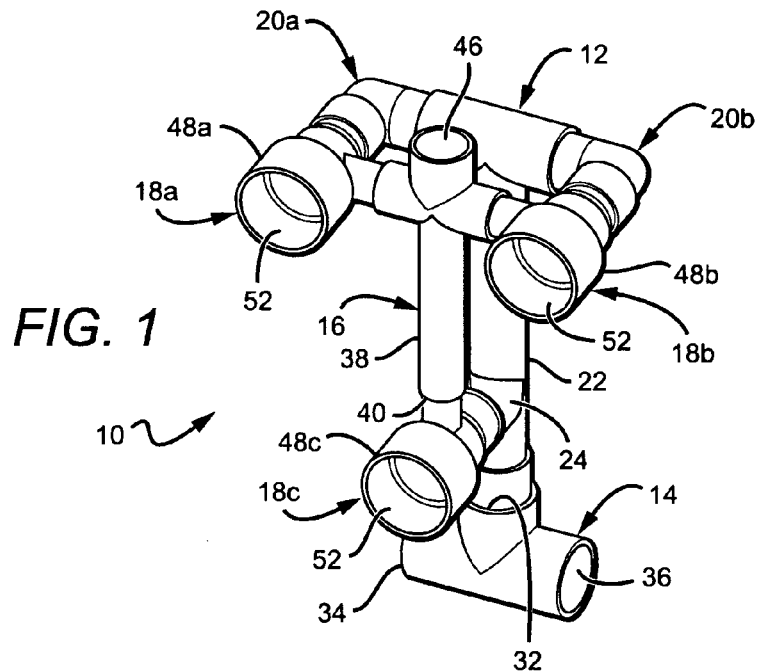
FIG. 1 is a perspective view of one embodiment of a multi-jet manifold according to the present invention.
Figure 2:
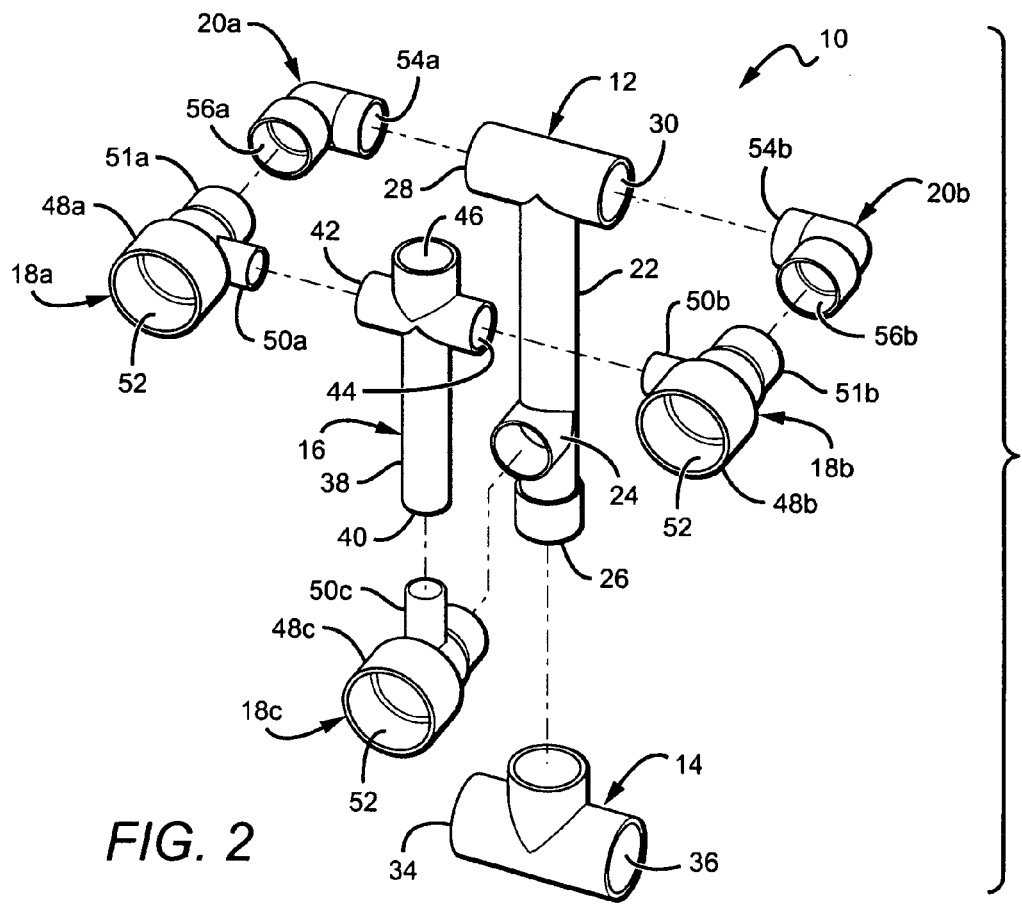
FIG. 2 is an exploded view of the multi-jet manifold shown in FIG. 1.

The following description presents several possible embodiments. This description is not to be taken in a limiting sense, but is made merely for the purpose of describing the general principles of the invention, the scope of which is further understood by the appended claims.

The present invention generally provides a multi-jet manifold apparatus and system for spas which allow groups of jets and/or other spa accessories to share a common water and/or air inlet system. Advantages of the multi-jet manifold and system include being: durable, inexpensive, incomplex, and customizable to a variety of desired applications.

FIGS. 1-4 show one embodiment of a multi-jet manifold 10 constructed in accordance with the present invention, having a first elongated T-shaped pipe structure 12, a second T-shaped pipe structure 14, a third elongated T-shaped pipe structure 16, three straight body pipes 18*a-c*, and two L-shaped pipes 20*a*, 20*b*. The multi-jet manifold 10 and its components are preferably formed from a plastic such as PVC, ABS or CPVC, but it is understood that other suitable materials may also be used.

The first T-shaped pipe structure 12 of the multi-jet manifold 10 includes an elongated cylindrical main body 22 having a first opening 24 on the lower half of the main body 22, with said first opening 24 extending peripherally from said main body 22 toward the front of multi-jet manifold 10. The main body 22 has a second opening 26, with the second opening 26 located at the bottom of the cylindrical main body 22. The main body 22 also comprises an upper T-shaped structure, with openings 28 and 30 extending in a T-shape away from main body 22 and toward the left and right of the multi-jet manifold 10. Openings 24, 28 and 30 each have a diameter sized to fit tightly over the complimentary end pieces of various other pipe structures within multi-jet manifold 10. Opening 26 has a diameter sized to fit tightly in the slightly larger diameter of complimentary first opening 32 of second T-shaped pipe structure 14. Pipe structure 12 comprises a hollow center through which water, air, or a combination of air and water may pass.

The second T-shaped pipe structure 14 of the multi-jet manifold 10 includes a first opening 32 extending upward from pipe structure 14 toward the top of multi-jet manifold 10. Pipe structure 14 includes openings 34 and 36 extending outward in a T-shape toward the left and right of the multi-jet manifold 10. Opening 32 has a diameter sized to fit tightly over complimentary second opening 26 of first pipe structure 12. Openings 34 and 36 comprise diameters sized to properly fit with conduits supplying water from a spa water pump assembly (best shown in FIG. 7). Pipe structure 14 comprises a hollow center through which water, air, or a combination of air and water may pass.

The third T-shaped pipe structure 16 of the multi-jet manifold 10 includes an elongated cylindrical main body 38 having a first opening 40 located at the bottom of the cylindrical main body 38. The main body 38 also comprises an upper T-shaped structure, with second openings 42 and 44 extending in a T-shape away from main body 38 and toward the left and right of the multi-jet manifold 10, and opening 46 located at the top of main body 38 and extending toward the top of multi-jet manifold 10. Openings 40, 42 and 44 each have a diameter sized to fit tightly over the complimentary end pieces of various other pipe structures within multi-jet manifold 10. Opening 46 comprises a diameter sized to properly fit with conduits supplying air from a spa air pump assembly (best shown in FIG. 7). Pipe structure 16 also comprises a hollow center through which air may pass. Although opening 46 preferably acts as an inlet for an air supply, it is understood that water or any water/air combination may be pumped through T-shaped pipe 16.

The straight body pipes 18a-c each include a cylindrical main body 48a-c respectively, with each main body 48a-c comprising a hollow sidearm 50a-c respectively. Each straight body pipe 18a-c also comprises a first opening 52, with each opening 52 extending toward the interior of a spa. Hollow sidearms 50a-c each have a diameter sized to fit tightly in complimentary openings 40, 42 and 44 of third pipe structure 16, with 50a fitting in opening 42, 50b fitting in opening 44, and 50c fitting in opening 40. Each opening 52 comprises a diameter sized to properly hold a jet or other spa accessory (not shown). Body pipes 18a-c and sidearms 50a-c comprise hollow centers through which water, air, or a combination of water and air may pass.

The L-shaped pipes 20a, 20b both include a hollow body with first openings 54a, 54b and second openings 56a, 56b. First openings 54a, 54b extend toward the center of multi-jet manifold 10, and comprise diameters sized to properly fit tightly in complimentary openings 28 and 30 of first pipe structure 12, with opening 54a fitting in opening 28 and opening 54b fitting in opening 30. Second openings 56a, 56b extend toward the front of multi-jet manifold 10, and comprise diameters sized to properly fit tightly over complimentary openings 51a, 51b of straight body pipes 18a, 18b respectively. L-shaped pipes 20a, 20b comprise hollow centers through which water, air, or a combination of water and air may pass.

Figure 3:
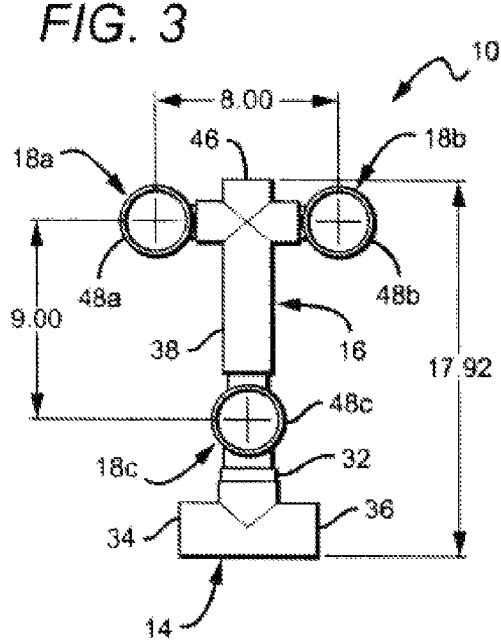
FIG. 3 is a front view with dimensions of the multi-jet manifold shown in FIG. 1.

In FIG. 3, dimensions (in inches) for the front side of one embodiment of multi-jet manifold 10 are depicted. For example, the longitudinal distance between the center of openings 52 for straight body pipes 18a and 18c may be 9.00 inches, while the latitudinal distance between the center of openings 52 for straight body pipes 18a and 18b may be 8.00 inches. Additionally, the longitudinal distance between the top of opening 46 and the bottom of T-shaped pipe 14 may be 17.92 inches.

Figure 4:
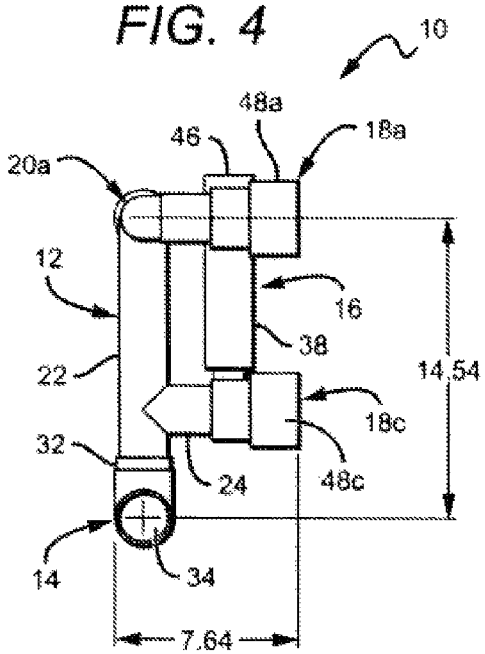
FIG. 4 is a side view with dimensions of the multi-jet manifold shown in FIG. 1.

In FIG. 4, dimensions (in inches) for the side of one embodiment of multi-jet manifold 10 are depicted. For example, the longitudinal distance between the center of opening 52 for straight body pipe 18a and the center of opening 34 for T-shaped pipe 14 may be 14.54 inches. Additionally, the distance from the rear of manifold 10 to the front of manifold 10 may, measured at the outside edge of opening 34 to the front of opening 52 of straight body pipe 18c, be 7.64 inches.

In practice, one or more manifolds such as that depicted in FIGS. 1-4 will be connected to a spa plumbing system located behind the wall of a spa. Water or a combination of water and air will be pumped through multi-jet manifold 10 via a spa water pump assembly. Water will enter the manifold 10 through openings 34 and 36 of T-shaped pipe 14, where it will pass through opening 32 into T-shaped pipe 12. The water will then be able to pass through any of openings 24, 28 or 30 of T-shaped pipe 12. If it passes through opening 24, it will move through straight body pipe 18c and into the interior of the spa via whatever jet or spa accessory is fitted into opening 52. If it passes through openings 28 or 30, it will move through L-shaped pipes 20a, 20b respectively, entering through openings 54a, 54b and exiting through openings 56a, 56b respectively. Once the water exits either of L-shaped pipes 20a, 20b, it will flow into straight body pipes 18a, 18b respectively, entering through openings 51a, 51b and flowing into the interior of the spa via whatever jet or spa accessory is fitted into respective openings 52.

Furthermore, air may be pumped through multi-jet manifold 10 via a spa air pump assembly. Air will enter the manifold 10 through opening 46 of T-shaped pipe 16, where it will then be able to pass through any of openings 40, 42 or 44 of pipe 16. If it passes through any of openings 40, 42, or 44, it will flow into straight body pipes 18a, 18b, or 18c via respective sidearms 50a, 50b, or 50c. It will then flow through whatever jet or spa accessory is fitted into openings 52 and then into the interior of the spa. While air may be preferably pumped through T-shaped pipe 16, it is understood that water or any water/air combination may also be pumped through T-shaped pipe 16.

Figure 5:
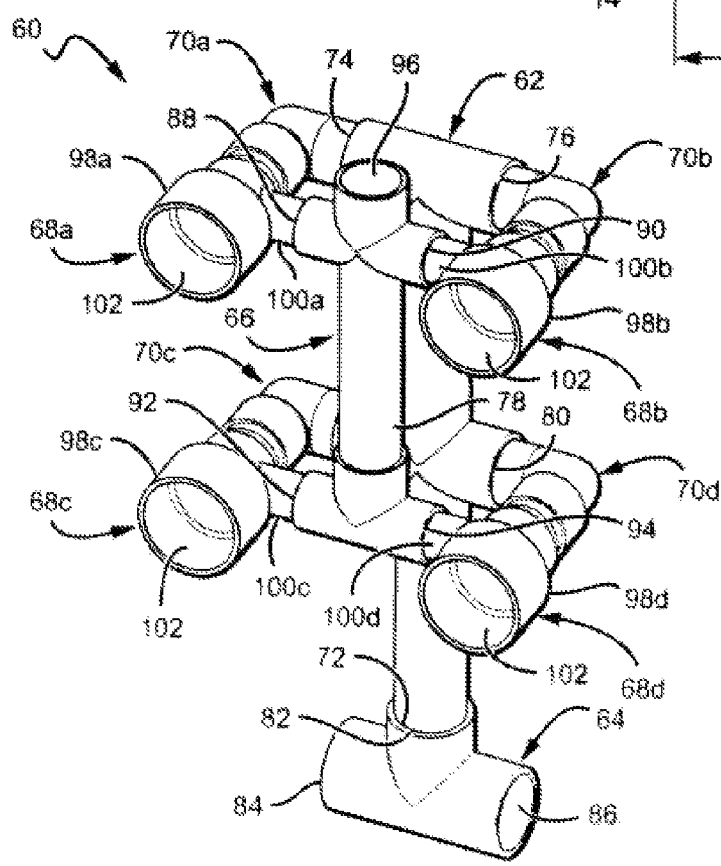
FIG. 5 is a perspective view of another embodiment of a multi-jet manifold according to the present invention.

FIG. 5 shows another embodiment of a multi-jet manifold 60 constructed in accordance with the present invention. Manifold 60 is similar in function and design to manifold 10 shown in FIGS. 1-4, with the main difference being that manifold 60 groups four jets and/or other spa accessories rather than the grouping of three described in manifold 10. Manifold 60 has a first elongated H-shaped pipe structure 62, a T-shaped pipe structure 64, a second elongated H-shaped pipe structure 66, four straight body pipes 68a-d, and four L-shaped pipes 70a-d.

The first H-shaped pipe structure 62 of manifold 60 includes an opening 72, with opening 72 extending below the H-shaped portion of structure 62. Structure 62 also comprises openings 74, 76, 78, 80 extending away from structure 62 and toward the left and right of manifold 60. Openings 74, 76, 78, 80 each have a diameter sized to fit tightly over the complimentary end pieces of various other pipe structures within manifold 60. Opening 72 has a diameter sized to fit tightly in the slightly larger diameter of complimentary first opening 82 of T-shaped pipe structure 64. Pipe structure 62 comprises a hollow center through which water, air, or a combination of air and water may pass.

T-shaped pipe structure 64 of manifold 60 includes first opening 82 extending upward from structure 64 toward the top of manifold 60. Structure 64 includes openings 84 and 86 extending outward in a T-shape toward the left and right of manifold 60. Openings 84 and 86 comprise diameters sized to properly fit with conduits supplying water from a spa water pump assembly. Structure 64 comprises a hollow center through which water, air, or a combination of air and water may pass.

Second H-shaped pipe structure 66 of manifold 60 includes openings 88, 90, 92, 94 extending away from structure 66 and toward the left and right of manifold 60, and opening 96 extending upward from structure 66 and toward the top of manifold 60. Openings 88, 90, 92, 94 each have a diameter sized to fit tightly over the complimentary end pieces of various other pipe structures within manifold 60. Opening 96 comprises a diameter sized to properly fit with conduits supplying air from a spa air pump assembly. Pipe structure 66 also comprises a hollow center through which air may pass. Although opening 96 preferably acts as an inlet for an air supply, it is understood that water or any water/air combination may be pumped through structure 66.

The straight body pipes 68a-d each include a cylindrical main body 98a-d respectively, with each main body 98a-d comprising a hollow sidearm 100a-d respectively. Each straight body pipe 68a-d also comprises a first opening 102, with each opening 102 extending toward the interior of a spa. Hollow sidearms 100a-d each have a diameter sized to fit tightly in complimentary openings 88, 90, 92, 94 of structure 66, with 10a fitting in opening 88, 100b fitting in opening 90, and 10c fitting in opening 92, and 100d fitting in opening 94. Each opening 102 comprises a diameter sized to properly hold a jet or other spa accessory (not shown). Body pipes 68a-d and sidearms 100a-d comprise hollow centers through which water, air, or a combination of water and air may pass.

The L-shaped pipes 70a-d include a hollow body with first openings extending toward the center of manifold 60, which comprise diameters sized to properly fit tightly in complimentary openings 74, 76, 78, 80 of pipe structure 62. The L-shaped pipes 70a-d also comprise second openings extending toward the front of manifold 60, which comprise diameters sized to properly fit tightly over complimentary rear openings of straight body pipes 68a-d. L-shaped pipes 70a-d comprise hollow centers through which water, air, or a combination of water and air may pass.

Figure 6:
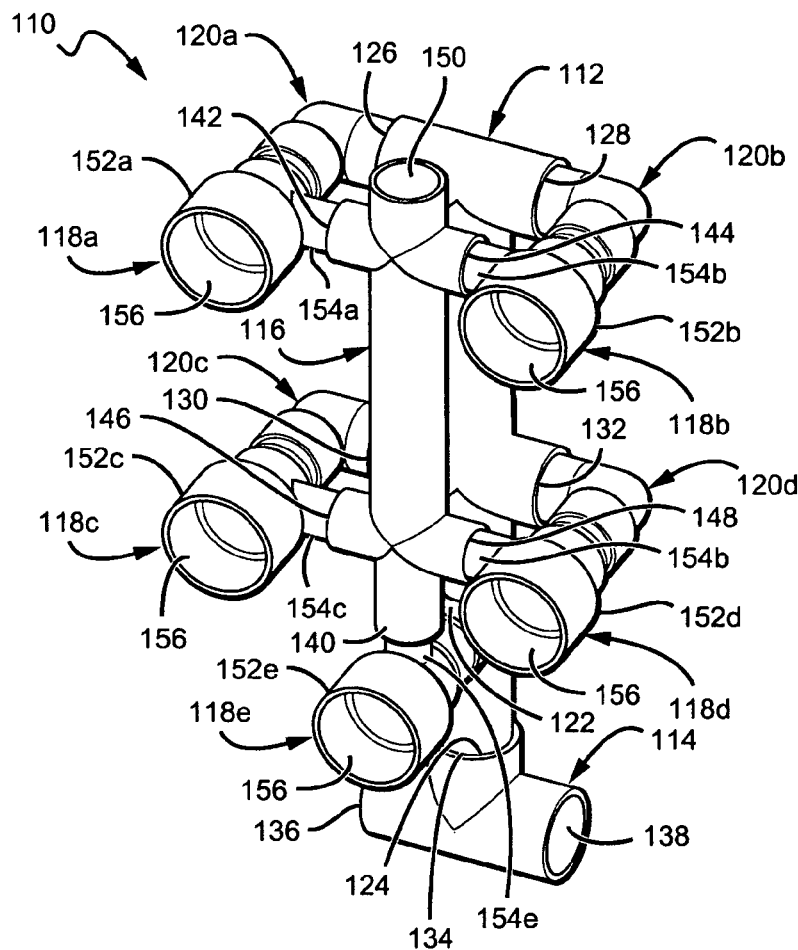
FIG. 6 is a perspective view of another embodiment of a multi-jet manifold according to the present invention.

FIG. 6 shows another embodiment of a multi-jet manifold 110 constructed in accordance with the present invention. Manifold 110 is similar in function and design to manifolds 10 and 60, with the main difference being that manifold 110 groups five jets and/or other spa accessories rather than the grouping of three described in manifold 10 and the grouping of four described in manifold 60. Manifold 110 has a first elongated multi-branch pipe structure 112, a T-shaped pipe structure 114, a second elongated multi-branch pipe structure 116, five straight body pipes 118a-e, and four L-shaped pipes 120a-d.

The first multi-branch pipe structure 112 of manifold 110 includes a first opening 122 on the lower half of structure 112, with the first opening 122 extending peripherally from structure 112 toward the front of manifold 110. Structure 112 also comprises a second opening 124, with opening 124 extending below the H-shaped portion of structure 112. Structure 112 also comprises openings 126, 128, 130, 132 extending away from structure 112 and toward the left and right of manifold 110. Openings 126, 128, 78, 80 each have a diameter sized to fit tightly over the complimentary end pieces of various other pipe structures within manifold 110. Opening 124 has a diameter sized to fit tightly in the slightly larger diameter of complimentary first opening 134 of T-shaped pipe structure 114. Pipe structure 112 comprises a hollow center through which water, air, or a combination of air and water may pass.

T-shaped pipe structure 114 of manifold 110 includes first opening 134 extending upward from structure 114 toward the top of manifold 110. Structure 114 includes openings 136 and 138 extending outward in a T-shape toward the left and right of manifold 110. Openings 136 and 138 comprise diameters sized to properly fit with conduits supplying water from a spa water pump assembly. Structure 114 comprises a hollow center through which water, air, or a combination of air and water may pass.

Second multi-branch pipe structure 116 of manifold 110 includes a first opening 140 located at the bottom of structure 116. Structure 116 also comprises openings 142, 144, 146, 148 extending away from structure 116 and toward the left and right of manifold 110, and opening 150 extending upward from structure 116 and toward the top of manifold 110. Openings 142, 144, 146, 148 each have a diameter sized to fit tightly over the complimentary end pieces of various other pipe structures within manifold 110. Opening 150 comprises a diameter sized to properly fit with conduits supplying air from a spa air pump assembly. Pipe structure 116 also comprises a hollow center through which air may pass. Although opening 116 preferably acts as an inlet for an air supply, it is understood that water or any water/air combination may be pumped through structure 116.

The straight body pipes 118a-e each include a cylindrical main body 152a-e respectively, with each main body 118a-e comprising a hollow sidearm 154a-e respectively. Each straight body pipe 118a-e also comprises a first opening 156, with each opening 156 extending toward the interior of a spa. Hollow sidearms 154a-e each have a diameter sized to fit tightly in complimentary openings 140, 142, 144, 146, 148 of structure 116, with 154a fitting in opening 142, 154b fitting in opening 144, and 154c fitting in opening 146, 154d fitting in opening 148, and 154e fitting in opening 140. Each opening 156 comprises a diameter sized to properly hold a jet or other spa accessory (not shown). Body pipes 118a-e and sidearms 154a-e comprise hollow centers through which water, air, or a combination of water and air may pass.

The L-shaped pipes 120a-d include a hollow body with first openings extending toward the center of manifold 110, which comprise diameters sized to properly fit tightly in complimentary openings 126, 128, 130, 132 of pipe structure 112. The L-shaped pipes 120a-d also comprise second openings extending toward the front of manifold 110, which comprise diameters sized to properly fit tightly over complimentary rear openings of straight body pipes 118a-d. L-shaped pipes 120a-d comprise hollow centers through which water, air, or a combination of water and air may pass.

Figure 7:
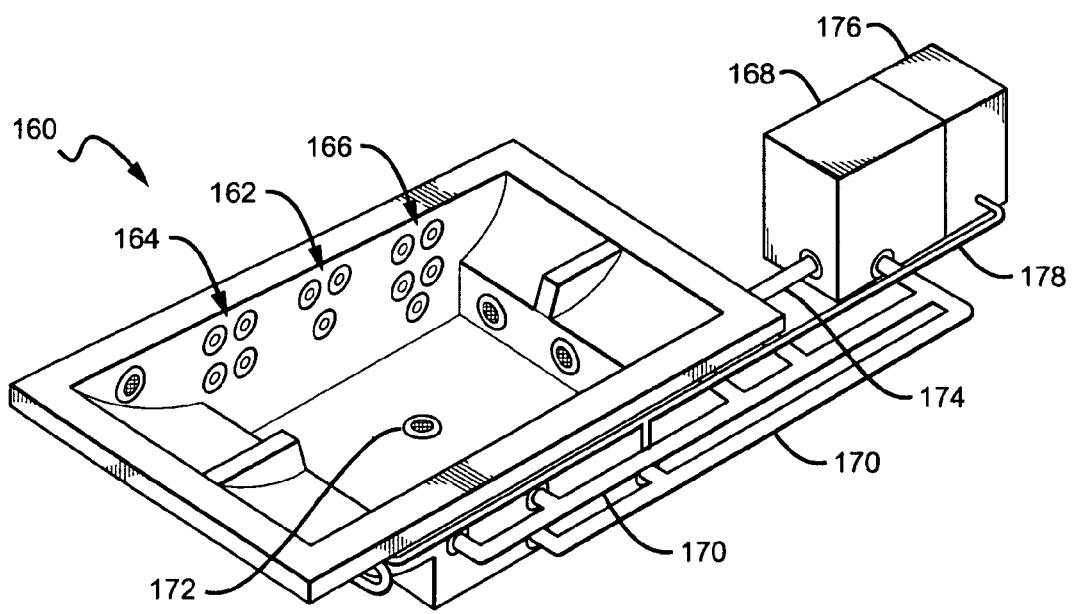
FIG. 7 is a perspective view of one embodiment of a spa system incorporating multi-jet manifolds according to the present invention.

As shown in FIG. 7, multiple jet groupings as part of manifolds according to the present invention can be installed in a spa or tub shell 160. Some or all of the jets and/or spa accessories can be attached to manifolds according to the present invention, with jets and/or spa accessory groupings 162, 164, 166 in this embodiment shown as attached to manifolds 10, 60, 110. All of the jets and/or spa accessories are connected to a water pump 168 (via their respective manifolds) used to circulate the water throughout the spa system, by a series of water conduits 170. Water from shell 160 is provided to pump 168 through the drain 172, which is connected through return water conduit 174 to pump 168. Water from pump 168 is provided back to shell 160 by conduits 170, where it flows into and through the manifolds and into jet and/or spa accessory groupings 162, 164, 166 and in turn into shell 160, completing the loop.

Additionally, an air system 176 can be included that provides air to groupings 162, 164, 166 through an air conduit 178 to aerate the water flowing through the jets. The air system 176 can be pump driven to increase the pressure of the air entering the groupings 162, 164, 166, or it can be vacuum based with the Venturis located within the individual jets and/or spa accessories, drawing air into the jets and/or spa accessories and water flow stream.

Although the present invention has been described in considerable detail with reference to certain preferred configurations and methods, other versions are possible. The invention can be used in many different types of spas. Different pipes, pipe configurations, jets and spa accessories can be used, and a variable number of pipes can be used to provide for any number of jet and/or spa accessory groupings in a single manifold. Additionally, any combination of water, air, water and air, or other like substances may be input through the manifold to produce a desired effect. Therefore, the spirit and scope of the above description should not be limited to the versions described above.

We claim:

1. A spa manifold, comprising:
    a first elongated pipe structure comprising a plurality of first arms and a central spine portion;
    a second elongated pipe structure comprising a plurality of second arms;
    a plurality of housing pipe segments, each of said plurality of housing pipe segments connected to one of said plurality of first arms and configured to house a jet or other spa accessory; and
    a T-shaped pipe structure shaped to define one or more openings, said T-shaped pipe structure connected to said central spine portion of said first elongated pipe structure;
    wherein each of said plurality of second arms is connected to one of said plurality of housing pipe segments, such that each of said plurality of housing pipe segments is connected to a respective one of said plurality of first arms and to a respective one of said plurality of second arms.

2. The spa manifold of claim 1, wherein said spa manifold is comprised of a water impervious plastic.

3. The spa manifold of claim 1, wherein said first elongated pipe structure comprises a substantially hollow center through which water, air, and/or a combination of air and water may pass.

4. The spa manifold of claim 1, wherein said second elongated pipe structure comprises a substantially hollow center through which air may pass.

5. The spa manifold of claim 1, wherein one of the one or more openings of said T-shaped pipe structure extends upward toward a top of said spa manifold.

6. The spa manifold of claim 5, wherein one of said plurality of first arms extends toward a bottom of said spa manifold to form a downward extending arm, said downward extending arm sized to fit an upward extending opening of said T-shaped pipe structure.

7. The spa manifold of claim 1, wherein one or more openings of said T-shaped structure extend peripherally outward from said T-shaped structure, said one or more openings sized to fit conduits supplying water from a water source to the spa manifold.

8. The spa manifold of claim 1, further comprising one or more L-shaped pipe segments each connecting one of said plurality of first arms to one of said plurality of housing pipe segments.

9. The spa manifold of claim 8, wherein said plurality of housing pipe segments further comprise hollow arms, said hollow arms coupled to said one or more L-shaped pipe segments.

10. The spa manifold of claim 1, wherein said second elongated pipe structure further comprises an upward facing opening, said upward facing opening sized to fit a conduit supplying air from an air source to the spa manifold.

11. The spa manifold of claim 1, further comprising a water supply configured to supply water to said first elongated pipe structure and an air supply configured to supply air into said second elongated pipe structure.

12. The spa manifold of claim 1, wherein said spa manifold is installed substantially behind a wall of a spa and further comprising jets and/or other spa accessories fitted in said plurality of housing pipe segments and disposed toward an interior of said spa.

13. A spa manifold system comprising:
    at least one manifold comprising:
        a first pipe structure shaped to define a plurality of openings through which water may flow, said first pipe structure comprising a central spine portion;
        a plurality of housing pipe segments for housing jets or other spa accessories, said plurality of housing pipe segments connected to said first pipe structure;
        a second pipe structure connected to said first pipe structure, said second pipe structure comprising a central spine portion, said second pipe structure defining two water inlets and one water outlet, wherein said water outlet of said second pipe structure is coupled to said central spine of said first pipe structure opposite said plurality of openings;
    a water source configured to supply water to said at least one manifold through said two water inlets; and
    a jet or spa accessory in each of said plurality of housing pipe segments.

14. The spa manifold system of claim 13, wherein the at least one manifold further comprises a third pipe structure shaped to define a plurality of openings through which air may flow.

15. The spa manifold system of claim 14, wherein each of said plurality of housing pipe segments further comprises a sidearm connecting said plurality of housing pipe segments to said third pipe structure.

16. The spa manifold system of claim 15, wherein an air supply flows into said at least one manifold through said third pipe structure and then into said plurality of housing pipe segments through said sidearm, said air supply mixing with said water and exiting said spa manifold system through said jets and/or spa accessories and into an interior of a spa.

17. The spa manifold system of claim 13, wherein said at least one manifold further comprises a plurality of L-shaped pipe segments, each of said L-shaped pipe segments connecting said first pipe structure and one of said plurality of housing pipe segments.

18. The spa manifold system of claim 17, wherein water is arranged to flow through said first pipe structure then through said plurality of L-shaped pipe segments and into said plurality of housing pipe segments before flowing out through one of said jets and/or spa accessories and into a spa.

19. The spa manifold system of claim 13, wherein said spa manifold system is installed substantially behind a spa wall of a spa, with the jets and/or other spa accessories exposed through holes in said spa wall and disposed toward an interior of said spa.

20. A manifold, comprising:
- a primary pipe structure comprising pipes approximately forming a T-shape or H-shape, said primary pipe structure approximately in a first plane;
- a T-shaped pipe structure coupled to a central spine of said primary pipe structure, said T-shaped pipe structure in said first plane;
- a secondary pipe structure comprising pipes approximately forming a T-shape or H-shape, said secondary pipe structure approximately in a second plane parallel to said first plane; and
- a plurality of body pipe structures connected to a respective pipe of said primary pipe structure and extending toward said second plane;
- wherein a respective pipe of said secondary pipe structure is connected to each of said plurality of body pipe structures, such that each of said plurality of body pipe structures is connected to a respective one of said pipes of said primary pipe structure and to a respective one of said pipes of said secondary pipe structure.

21. The manifold of claim 20, further comprising a plurality of connector pipe structures;
- wherein each of said plurality of connector pipe structures connects said secondary pipe structure to a respective one of said plurality of body pipe structures.

22. The manifold of claim 21, wherein each of said plurality of connector pipe structures is approximately perpendicular to its respective one of said plurality of body pipe structures.

23. The manifold system of claim 20, wherein said plurality of body pipe structures are approximately orthogonal to said first plane.

* * * * *